J. L. T. POPP.
MIXING VALVE OR FAUCET.
APPLICATION FILED DEC. 7, 1918.
1,337,952. Patented Apr. 20, 1920.
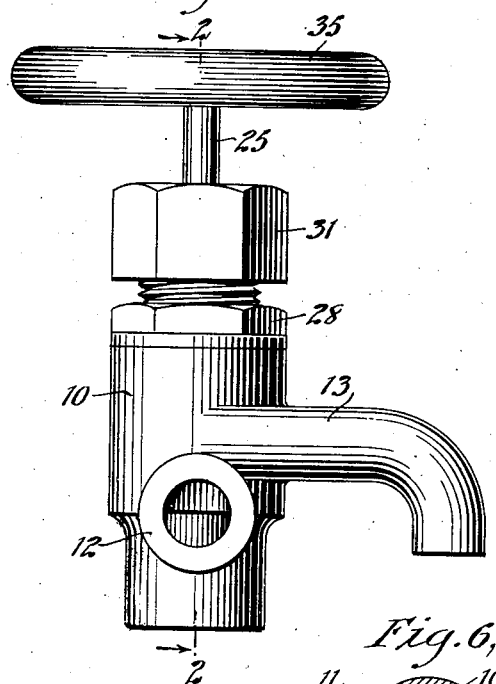
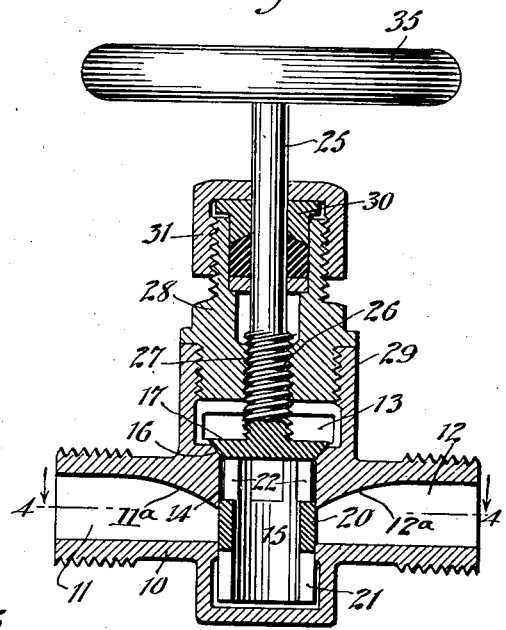
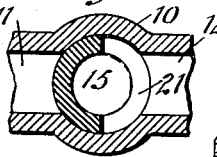
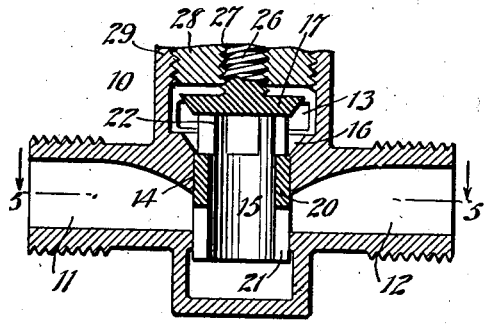
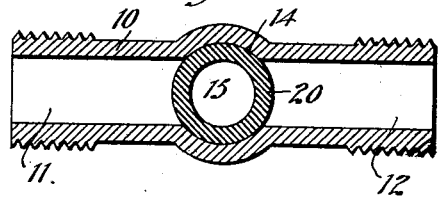
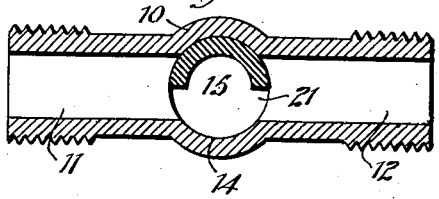
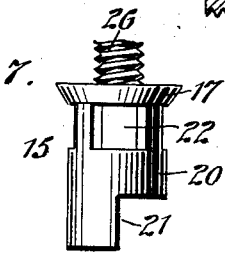
WITNESSES
INVENTOR
Jonas L. T. Popp
BY
ATTORNEYS

UNITED STATES PATENT OFFICE.

JONAS LUDVIG THEODORE POPP, OF NIAGARA FALLS, NEW YORK.

MIXING VALVE OR FAUCET.

1,337,952.   Specification of Letters Patent.   Patented Apr. 20, 1920.

Application filed December 7, 1918. Serial No. 265,714.

*To all whom it may concern:*

Be it known that I, JONAS L. T. POPP, a citizen of the United States, and a resident of Niagara Falls, in the county of Niagara and State of New York, have invented a new and Improved Mixing Valve or Faucet, of which the following is a full, clear, and exact description.

The invention relates to valves or faucets used on bath tubs, basins, sinks and similar fixtures, and its object is to provide a new and improved mixing valve or faucet connected with a hot water supply and a cold water supply, and arranged to permit the user to draw either hot water or cold water or a mixture of the same. Another object is to permit of setting the mixing valve or faucet for mixing hot and cold water to any desired degree of temperature to suit the user. Another object is to dispense with the separate hot and cold water valves or faucets now generally used thus reducing the expense of installation. Another object is to provide a mixing valve or faucet which is simple and durable in construction and not liable easily to get out of order.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the mixing valve;

Fig. 2 is a vertical section of the same on the line 2—2 of Fig. 1 and with the valve plug in closed position;

Fig. 3 is a similar view of the same with the valve plug in open position for the passage of both cold and hot water;

Fig. 4 is a sectional plan view of the mixing valve or faucet on the line 4—4 of Fig. 2;

Fig. 5 is a similar view of the same on the line 5—5 of Fig. 3;

Fig. 6 is a similar view of the same with the valve plug in position for admitting Fig. 7 is a side elevation of the valve plug.

The valve body 10 is provided with inlets 11 and 12, an outlet or discharge spout 13 and a central cylindrical valve seat 14 in which is mounted to turn and to move bodily up and down a valve plug 15. The inlet 11 is adapted to be connected with a hot water supply and the inlet 12 is adapted to be connected with a cold water supply. The said inlets 11 and 12 connect with the central valve seat 14 at opposite sides thereof one wall of each of said inlets inclining toward the central valve seat, as indicated by 11$^a$ and 12$^a$, while the outlet 13 connects with the upper end of the said valve seat 14. The valve seat 14 is provided at its upper end with a conical seat 16 on which is adapted to be seated a conical valve disk 17 attached to or forming part of the upper end of the valve plug 15.

The valve plug 15 is open at the bottom and closed at the top by the valve disk 17, and the valve plug 15 is provided with an annular closing portion 20 adapted to close both inlets 11 and 12 at the time the valve plug 15 is in lowermost position and the valve disk 17 is seated on the conical seat 16, as plainly shown in Fig. 2. The lower end of the valve plug 15 is provided with a semicircular inlet port 21 adapted to connect the interior of the valve plug 15 with both inlets 11 and 12 at the same time, as plainly shown in Fig. 5, or with either of the said inlets 11 or 12, as indicated in full and dotted lines in Fig. 6. The upper portion of the valve plug 15 is provided with one or more outlet ports 22 adapted to connect the interior of the plug 15 with the outlet spout 13 whenever the valve plug is moved upward into discharging position, as plainly shown in Fig. 3.

In order to turn the valve plug 15 and to move the same bodily up or down, the following arrangement is made: The valve plug 15 is provided with a valve stem 25 having a threaded portion 26 screwing in a threaded bore 27 formed centrally in a bonnet 28 screwed or otherwise attached to the upper portion 29 of the valve body 10. The valve stem 25 extends through a stuffing box 30 held on the upper end of the bonnet 28 by a screw cap 31. The upper outer end handle or handwheel 35 under the control of the user for turning the valve stem 25 with a view to screw the threaded portion 26 up or down in the bonnet 28 so as to raise or lower the valve plug 15 and to turn the same in its seat 14. When the valve plug 15 is in lowermost closed position, as shown in Fig. 2, then the valve disk 17 is seated on the valve seat 16 to disconnect the interior of the valve plug 15 from the outlet 13. The closing portion 20 of the valve plug 15 is now in register with both inlets 11 and 12 so that the latter are closed to the interior of the valve plug 15. When it is desired to draw a mixture of hot and cold water the operator turns the handwheel 35 to raise the valve plug 15 until the semicircular port 21 is in register with both inlets 11 and 12, as shown in Figs. 3 and 5, thus allowing the hot and cold water to flow through the port 21 into the valve plug 15 and through the ports 22 thereof to the outlet 13 thus providing a mixture of hot and cold water, the temperature of which can be regulated by opening the port 21 more or less relative to the corresponding inlet 11 or 12. Thus if some hot water is desired, the valve plug 15 is turned so that the port 21 is open more fully to the inlet 11 and less to the inlet 12 to admit more hot water than cold water. When the temperature of the mixture is to be reduced the valve plug 15 is turned so that the port 21 is more fully in register with the inlet 12 than the inlet 11. When it is desired to draw only hot water a quarter turn is given to the valve plug 15 to open the port 21 full to the inlet 11 and to cut off the inlet 12, and when only cold water is to be drawn the valve plug is turned until the port 21 is in full register with the inlet 12 while the inlet 11 is closed (see Fig. 6).

It is understood that by having the closing middle portion 20 and the valve disk 17, leakage is prevented as the water is cut off at both points.

It will also be noticed that by the arrangement described the user can readily draw hot water or cold water or a mixture of the same at a desired temperature.

It should be further noted that by having one wall of the inlets inclined to the central valve seat 14, said walls form a stop for the water when all ports are blanked, and also serve to direct and concentrate the incoming hot and cold water into the mixing space at the bottom of the valve chamber, as clearly shown in Fig. 2.

Having thus described my invention, I claim as new and desire to secure by Letters Patent:—

1. A mixing valve or faucet, comprising a valve body having an outlet and inlets, of which inlets one is adapted to be connected with a cold water supply and the other with a hot water supply, and a laterally perforated hollow valve plug mounted in the said valve body to turn, and to slide bodily lengthwise of its axis, the said valve plug having a valve disk and the valve body a coöperating valve seat intermediate the inlet and outlet, the valve plug in one position being closed to the outlet and to both inlets, the said valve plug in another position connecting both inlets with the outlet, the said valve plug in another position connecting but one of the inlets with the outlet, and the valve plug in another position connecting the other inlet with the outlet, one wall of the said inlets being inclined to the valve seat at their discharge ends, whereby said inlets constitute a stop when all ports are blanked and also concentrating means for incoming hot and cold water in the mixing space of the valve body.

2. A mixing valve or faucet, comprising a valve body having an outlet and inlets, said inlets being positioned in the valve body, diametrically opposite each other, and of which inlets one is adapted to be connected with a cold water supply and the other with a hot water supply, and a valve plug mounted in the said valve body to turn and to slide bodily lengthwise of its axis, the said valve plug being hollow and provided at its middle with an annular closing portion adapted to close both inlets, the valve plug having an approximately semi-annular downwardly projecting portion below the annular closing portion and inclosing an inlet port adapted to connect the interior of the valve plug with either or both inlets, and the said valve plug having an outlet port adapted to connect the interior of the valve plug with the said outlet.

3. A mixing valve or faucet, comprising a valve body having an outlet and inlets, of which inlets one is adapted to be connected with a cold water supply and the other with a hot water supply, and a valve plug mounted in the said valve body to turn and to slide bodily lengthwise of its axis, the said valve plug being hollow and provided at its middle with an annular closing portion adapted to close both inlets, the valve plug having an approximately semicircular inlet port adapted to connect the interior of the valve plug with either or both inlets and the said valve plug having an outlet port adapted to connect the interior of the valve plug with the said outlet, the said inlet port being below the said closing portion and the said outlet port being above the said closing portion.

4. A mixing valve or faucet, comprising a valve body having an outlet and inlets, of which inlets one is adapted to be connected with a cold water supply and the other with a hot water supply, and a valve plug mounted in the said valve body to turn and to slide bodily lengthwise of its axis, the said valve plug being hollow and provided at its middle with an annular closing portion adapted to close both inlets, the valve plug having an approximately semicircular inlet port adapted to connect the interior of the valve plug with either or both inlets and the said valve plug having an outlet port adapted to connect the interior of the valve plug with the said outlet, the said valve plug having a valve disk and the said valve body having a valve seat intermediate the outlet and inlets.

JONAS LUDVIG THEODORE POPP.